(12) United States Patent
Dasgupta

(10) Patent No.: US 11,593,611 B2
(45) Date of Patent: *Feb. 28, 2023

(54) NEURAL NETWORK COOPERATION

(71) Applicant: INTERNATIONAL BUSINESS MACHINES CORPORATION, Armonk, NY (US)

(72) Inventor: Sakyasingha Dasgupta, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1248 days.

This patent is subject to a terminal disclaimer.

(21) Appl. No.: 15/804,197

(22) Filed: Nov. 6, 2017

(65) Prior Publication Data

US 2018/0268286 A1  Sep. 20, 2018

Related U.S. Application Data

(63) Continuation of application No. 15/463,195, filed on Mar. 20, 2017.

(51) Int. Cl.
*G06N 3/04* (2006.01)
*G06N 3/08* (2006.01)
*G06N 20/00* (2019.01)
*G06N 3/084* (2023.01)

(52) U.S. Cl.
CPC ......... *G06N 3/0445* (2013.01); *G06N 3/0454* (2013.01); *G06N 3/0472* (2013.01); *G06N 3/08* (2013.01); *G06N 3/084* (2013.01); *G06N 20/00* (2019.01)

(58) Field of Classification Search
CPC .... G06N 3/0445; G06N 20/00; G06N 3/0454; G06N 3/0472; G06N 3/08; G06N 3/084
See application file for complete search history.

(56) References Cited

U.S. PATENT DOCUMENTS 6,297,439 B1 * 10/2001  Browne ............... G10H 1/26
84/DIG. 12
2016/0071024 A1  3/2016  Amer et al.
2016/0140434 A1  5/2016  Yilmaz et al.

FOREIGN PATENT DOCUMENTS

CN    104809502 A    7/2015
JP    2016071697 A   5/2016

OTHER PUBLICATIONS

Boulanger-Lewandowski, Nicolas, Yoshua Bengio, and Pascal Vincent. "Modeling temporal dependencies in high-dimensional sequences: Application to polyphonic music generation and transcription." arXiv preprint arXiv:1206.6392 (2012). (Year: 2012).*

(Continued)

*Primary Examiner* — Michael J Huntley
*Assistant Examiner* — Sehwan Kim
(74) *Attorney, Agent, or Firm* — Tutunjian & Bitetto, P.C.; Randy Emilio Tejada

(57) ABSTRACT

Cooperative neural networks may be implemented by providing an input to a first neural network including a plurality of first parameters, and updating at least one first parameter based on an output from a recurrent neural network provided with the input, the recurrent neural network including a plurality of second parameters.

6 Claims, 7 Drawing Sheets

(56) References Cited

OTHER PUBLICATIONS

Ranzato, Marc'Aurelio, et al. "Modeling natural images using gated MRFs." IEEE transactions on pattern analysis and machine intelligence 35.9 (2013): 2206-2222. (Year: 2013).*

Osogami, Takayuki, and Makoto Otsuka. "Learning dynamic Boltzmann machines with spike-timing dependent plasticity." arXiv preprint arXiv:1509.08634 (2015). (Year: 2015).*

Osogami, Takayuki, and Makoto Otsuka. "Seven neurons memorizing sequences of alphabetical images via spike-timing dependent plasticity." Scientific reports 5 (2015): 14149. (Year: 2015).*

Sutskever, Ilya, Geoffrey E. Hinton, and Graham W. Taylor. "The recurrent temporal restricted boltzmann machine." Advances in neural information processing systems. 2009. (Year: 2009).*

Wikipedia, "Recurrent neural network", Mar. 11, 2017, https://en.wikipedia.org/w/index.php?title=Recurrent_neural_network&oldid=769709356 (Year: 2017).*

Wikipedia, "Boltzmann machine", Jan. 5, 2017, https://en.wikipedia.org/w/index.php?title=Boltzmann_machine&oldid=758504676 (Year: 2017).*

Shetty, Rakshith, and Jorma Laaksonen. "Video captioning with recurrent networks based on frame-and video-level features and visual content classification." arXiv preprint arXiv:1512.02949 (2015). (Year: 2015).*

Boulanger-Lewandowski, Nicolas, Yoshua Bengio, and Pascal Vincent. "High-dimensional sequence transduction." 2013 IEEE International Conference on Acoustics, Speech and Signal Processing. IEEE, 2013. (Year: 2013).*

Grace Period Disclosure, "Nonlinear Dynamic Boltzmann Machines for Time-series Prediction", Sakyasingha Dasgupta and Takayuki Osogami, Feb. 4, 2017 made publicly available, pp. 1-11.

Hausler, C. et al., "Temporal Autoencoding Improves Generative Models of Time Series" JMLR: Workshop and Conference Proceedings (Sep. 2013) pp. 1-14.

Taylor, G., "Compact modeling of high-dimensional time-series" Department of Computer Science, University of Toronto (Nov. 2007) pp. 1-29.

Hochreiter, S. et al., "Long Short-Term Memory" Neural Computation (1997) pp. 1735-1780, vol. 9.

Taylor, G. et al., "Two Distributed-State Models for Generating High-Dimensional Time Series" Journal of Machine Learning Research (Mar. 2011) pp. 1025-1068, vol. 12.

List of IBM Patents or Patent Applications Treated as Related dated Nov. 6, 2017, 2 pages.

\* cited by examiner

NEURAL NETWORK COOPERATION

STATEMENT REGARDING PRIOR DISCLOSURES BY THE INVENTOR OR A JOINT INVENTOR

The following disclosure is submitted under 35 U.S.C. § 102(b)(1)(A): DISCLOSURE: "Nonlinear Dynamic Boltzmann Machines for Time-series Prediction", Sakyasingha Dasgupta and Takayuki Osogami, Feb. 4, 2017 made publicly available, pp. 1-11.

BACKGROUND

Technical Field

The present invention relates to neural network cooperation. More specifically, the present invention relates to the cooperation of neural networks processing the same input.

Background

The originally proposed Dynamic Boltzmann Machine DyBM provides a particularly structured Boltzmann machine (BM) using eligibility traces and first-in first-out (FIFO) queues, as a stochastic generative model of a multi-dimensional time-series. The learning rule is based on maximizing the log-likelihood of the given time-series.

The original DyBM could only deal with binary data and was subsequently extended for real-valued data in the Gaussian DyBM model. However, in both these models the memory of DyBM is dependent on the number of visible units and the maximum delay length (First-In-First-Out (FIFO) queue length) that models the data as a linear dynamical system.

Many real world time-series data are high-dimensional where, values at a given time can depend non-linearly on its own history.

SUMMARY

According to a first aspect of the present invention, provided is a method including providing an input to a first neural network including a plurality of first parameters, and updating at least one first parameter based on an output from a recurrent neural network provided with the input, the recurrent neural network including a plurality of second parameters. According to the first aspect, the method may improve the learning of high-dimensional time-series' by enabling longer temporal memory in a neural network, which can be applied with binary or real valued data, that can also deal with nonlinear dynamics of the data.

The first aspect may also include a program for implementing the method, a computer executing the program, and an apparatus that performs the method.

According to a second aspect of the present invention, provided is a method including providing an input to a recurrent neural network (RNN) including a plurality of second parameters, and updating the plurality of second parameters based on a learning objective of a first neural network provided with the input. According to the first aspect, the method may improve the learning of high-dimensional time-series' by enabling longer temporal memory in a neural network, which can be applied with binary or real valued data, that can also deal with nonlinear dynamics of the data.

The second aspect may also include a program for implementing the method, a computer executing the program, and an apparatus that performs the method.

The summary does not necessarily describe all necessary features of the embodiments of the present invention. The present invention may also include sub-combinations of the features described herein.

DETAILED DESCRIPTION

Hereinafter, example embodiments of the present invention will be described. The example embodiments shall not limit the invention according to the claims, and the combinations of the features described in the embodiments are not necessarily essential to the invention.

Embodiments of the present invention may implement cooperation of neural networks processing the same input, which may improve the learning of high-dimensional time-series by enabling longer temporal memory in neural networks, such as DyBM, which can be applied with binary or real valued data, that can also deal with nonlinear dynamics of the data. Cooperative networks with nonlinear feature maps along with a long temporal memory may better model such dependence.

In many embodiments, a nonlinear memory DyBM may update the bias parameter at each time frame using a recurrent neural network (RNN) layer that computes a nonlinear feature map of past input sequences to DyBM, and then the parameters of DyBM and output weights from RNN layer may be learned based on maximizing the log-likelihood of the given time-series.

A Gaussian DyBM may be connected with an M-dimensional RNN, whose state vector $\Psi^{[t]}$ is a nonlinear feature mapping ($\Psi^{[t]} = \mathcal{F}(\Psi^{[t-1]}, X^{[t]})$) of its own history and the N-dimensional time-series input data vector at time t−1. Here $\mathcal{F}$ may be any suitable nonlinear function, such as $\mathcal{F} = \tan h$. The bias vector of DyBM at each time point $b^{[t]}$ may be dependent on its previous value and the weighted output of the RNN-layer.

The state of the RNN may be updated, and the bias vector may then be updated. In many embodiments the RNN output is not corrected, but the feature map is simply updated. By treating the RNN as a reservoir network, these weights are initialized randomly and kept fixed. A dimensionally learned RNN-to-DyBM output weight matrix may map the RNN state to the bias vector. In addition, based on the standard Gaussian DyBM, an eligibility trace vector and FIFO queue may be maintained.

Based on this architecture, the parameters of DyBM, biases and weights, and the RNN-to-DyBM output weight matrix may be updated at each time step using a stochastic gradient descent rule that maximizes the log-likelihood of the time-series data being modeled. The combination of DyBM and RNN may not need back propagation.

Figure 1:
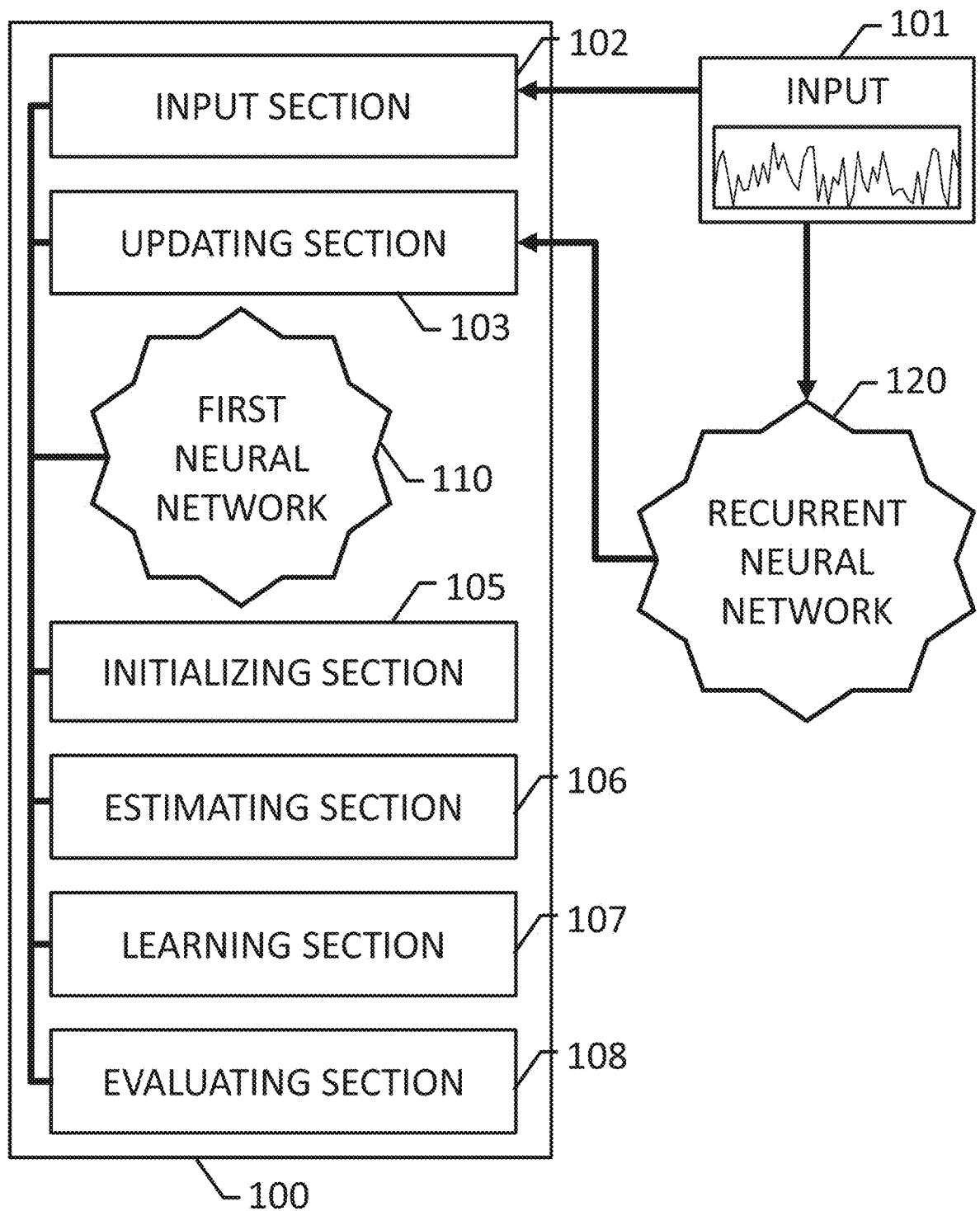
FIG. 1 shows an apparatus for updating a first neural network based on a recurrent neural network, according to an embodiment of the present invention.

FIG. 1 shows an apparatus 100 for updating a first neural network 110 based on a recurrent neural network 120, according to an embodiment of the present invention. Apparatus 100 may be a host computer such as a server computer or a mainframe computer that executes an on-premise application and hosts client computers that use it. Apparatus 100 may be a computer system that includes two or more computers. Alternatively, apparatus 100 may be a personal computer that executes an application for a user of apparatus 100.

Apparatus 100 may include an input section 102, an updating section 103, an initializing section 105, an estimating section 106, a learning section 107, an evaluating section 108, and first neural network 110. Apparatus 100 may be a computer program product including one or more computer readable storage mediums collectively storing program instructions that are executable by a computer to cause the computer to perform the operations of the various sections. Apparatus 100 may alternatively be analog or digital programmable circuitry, or any combination thereof, including chip-based neural networks and recurrent neural networks. Apparatus 100 may be composed of physically separated storage or circuitry that interacts through communication.

Input section 102 may provide data to first neural network 110 from data stores in communication with apparatus 100. For example, input section 102 may be configured to provide an input, such as input 101, to first neural network 110, first neural network 110 including a plurality of first parameters. Input 101 may be a time series including time frames, each time frame having data specific to that time frame. Input section 102 may communicate directly with such data stores, or may utilize a transceiver to communicate with a computer through wired or wireless communication across a network.

Updating section 103 may update the parameters of one or more neural networks, such as first neural network 110. For example, updating section 103 may be configured to update at least one first parameter based on an output from a recurrent neural network provided with the input, such as recurrent neural network 120, the recurrent neural network including a plurality of second parameters. Updating section 103 may be further configured to update a plurality of eligibility traces and a plurality of first-in-first-out (FIFO) queues.

Initializing section 105 may initialize the parameters of one or more neural networks. For example, initializing section 105 may be configured to initialize the plurality of first parameters to zero.

Estimating section 106 may estimate details of input data based on known or assumed characteristics of the input data. For example, estimating section 106 may be configured to estimate a mean of the current time frame of input 101 using a conditional probability density of input 101, wherein a current time frame of input 101 is assumed to have a Gaussian distribution.

Learning section 107 may learn parameters of one or more neural networks, and details of input data. For example, learning section 107 may be configured to learn the parameters of first neural network 110, a standard deviation of the current time frame of input 101, and a plurality of output weight values of output from recurrent neural network 120.

Evaluating section 108 may evaluate learning objectives for neural networks. For example, evaluating section 108 may be configured to evaluate a learning objective of the first neural network.

An apparatus, such as apparatus 100, may be useful for DyBM. Apparatus 100 can also be used for any neural network model adapted for cooperation with another neural network receiving the same input. A DyBM may be defined from a Boltzmann Machine (BM) having multiple layers of units, where one layer represents the most recent values of a time-series, and the remaining layers represent the historical values of the time-series. The most recent values are conditionally independent of each other given the historical values. It may be equivalent to such a BM having an infinite number of layers, so that the most recent values can depend on the whole history of the time series. For unsupervised learning, a DyBM may be trained in such a way that the likelihood of a given time-series is maximized with respect to the conditional distribution of the next values given the historical values Similar to a BM, a DyBM may include a network of artificial neurons. Each neuron may take a binary value, 0 or 1, following a probability distribution that depends on the parameters of the DyBM. Unlike the BM, the values of the DyBM can change over time in a way that depends on its previous values. That is, the DyBM may stochastically generate a multi-dimensional series of binary values.

Learning in conventional BMs may be based on a Hebbian formulation, but is often approximated with a sampling based strategy like contrastive divergence. In this formulation, the concept of time is largely missing. In DyBM, like biological networks, learning may be dependent on the timing of spikes. This is called spike-timing dependent plasticity, or STDP, which means that a synapse is strengthened if the spike of a pre-synaptic neuron precedes the spike of a post-synaptic neuron (long term potentiation—LTP), and the synapse is weakened if the temporal order is reversed (long term depression—LTD). The conventional DyBM may use an exact online learning rule that has the properties of LTP and LTD.

Figure 2:
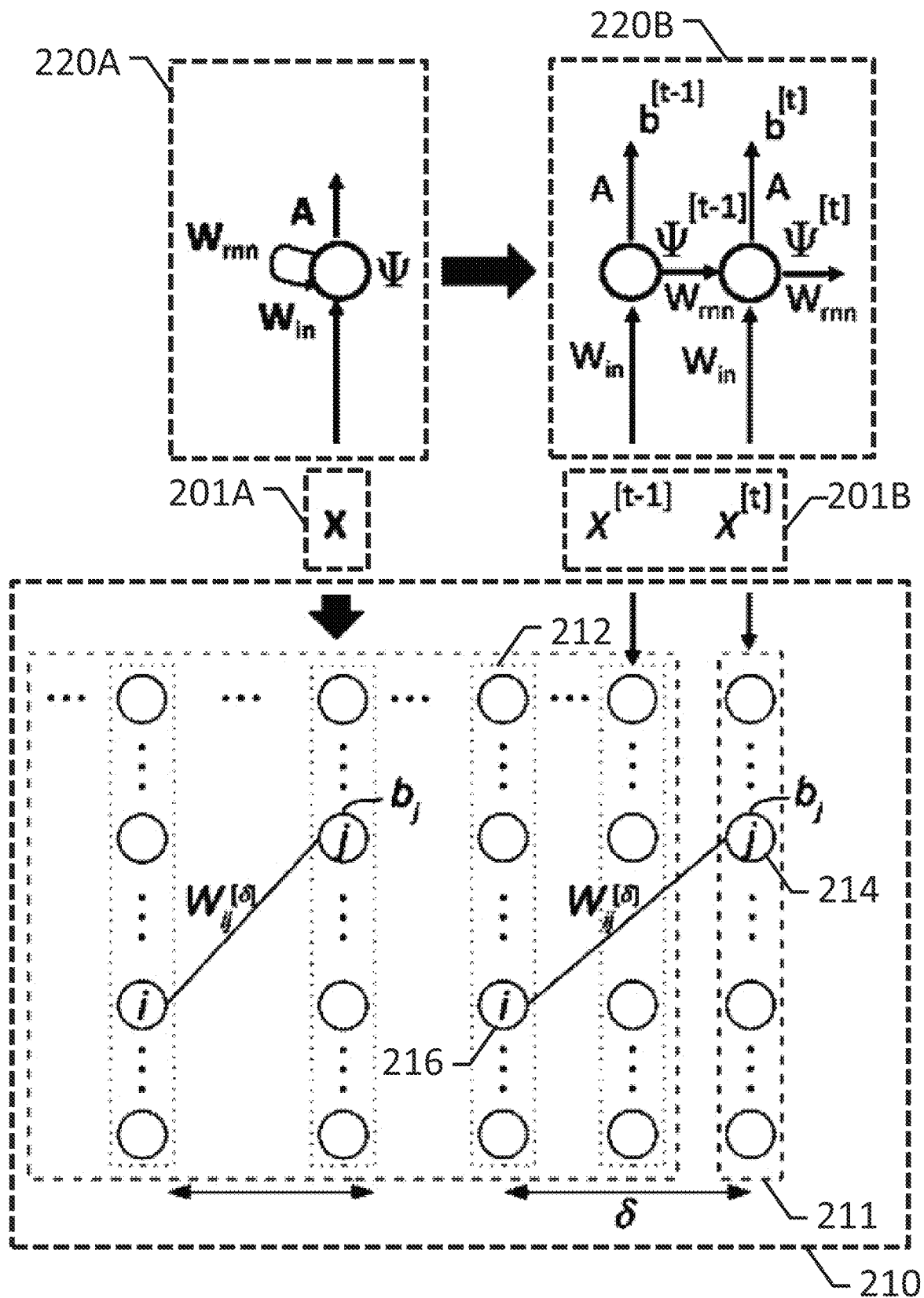
FIG. 2 shows a cooperation including a Gaussian dynamic Boltzmann machine (DyBM) as an example of a first neural network, according to an embodiment of the present invention.

FIG. 2 shows a cooperation between a Gaussian dynamic Boltzmann machine (DyBM) 210, as an example of a first neural network, and a recurrent neural network 220, according to an embodiment of the present invention.

DyBM 210 may include a plurality of layers of nodes among a plurality of nodes, each layer sequentially forwarding values of a time frame of the input, the plurality of layers of nodes including a first layer 211 of input nodes, such as input node 214, among the plurality of nodes, the input nodes receiving values of a current time frame of the input, and a plurality of intermediate layers, such as intermediate layer 212, each node, such as node 216, in each intermediate layer forwarding a value to a node in a subsequent or shared layer, and a plurality of weight values among the plurality of first parameters, each weight value to be applied to each value in the corresponding node to obtain a value propagating from a pre-synaptic node to a post-synaptic node.

In DyBM 210, let N be the number of nodes in each layer, and T be the number of intermediate layers. In this manner, DyBM 210 can represent series 201A of N-dimensional patterns of length T+1. The series of patterns 201B is denoted as $x^{[t-T,t]} \equiv (x^s)_{s=t-T,\ldots,t}$ for some time t. That is, the $\delta$-th layer represents the pattern, $x^{[t-\delta]} \equiv (x_i^{[t-\delta]})_{i=1,\ldots,N}$, at time $t-\delta$ for $\delta=0, 1, \ldots, T$.

DyBM 210 has three kinds of parameters: bias, variance, and weight, which determine the probability distribution of the patterns that the DyBM 210 generates. For $i=1, \ldots, N$, let $b_i$ be the bias of the i-th unit of any layer and $\sigma_i^2$ be the variance of the i-th unit of any layer. Let $w_{i,j}^{[\delta]}$ be the weight between the i-th unit of the $(s+\delta)$-th layer and the j-th unit of the s-th layer for $s=0, \ldots, T-\delta$, and $\delta=1, \ldots, T$.

Recurrent neural network (RNN) 220 is shown generally as 220A and in time-based form as 220B. In some embodiments, RNN 220 may be an echo state network, but without a target with which to learn the parameters. Thus, in these embodiments, RNN 220 may simply update the feature map as a time-series input unfolds in an attempt to learn the underlying distribution.

RNN 220 may be a nonlinear extension of DyBM 210 by updating the bias parameter vector b, at each time using an RNN layer. This RNN layer computes a nonlinear feature map of the past time series input to DyBM 210. Output weights from RNN 220 to the bias layer along with the first parameters of DyBM 210 can be updated online using a stochastic gradient method.

RNN 220 may be an M-dimensional RNN, whose state vector changes dependent on a nonlinear feature mapping of its own history and the N-dimensional time-series input data vector at time t−1. For most settings, M>N, which may increase the number of dimensions that may be adequately analyzed. M is not exactly defined by the time-series input, but can be estimated based on N. In some embodiments, M is set to 10, 15, or 20 times N. The size of M determines the size of memory needed by RNN 220. The bias vector may be time-dependent and updated at each time.

In this embodiment, $\Psi^{[t]}$ is the M×1 dimensional state vector at time t of M-dimensional RNN 220. A is the M×N dimensional learned output weight matrix that connects the RNN state to the bias vector. The RNN state is updated based on the input time-series vector 201B, which may include any suitable nonlinear function, e.g., rectified linear units, sigmoid, etc., and a leak rate hyper-parameter $\rho$ of RNN 220, which controls the amount of memory in each node of the RNN layer. $W_{rnn}$ and $W_{in}$ are the M×M dimensional RNN weight matrix and N×M dimensional projection of the time series input to the RNN layer, respectively. RNN 220 may be similar to an echo state network, such that the weight matrices $W_{rnn}$ and $W_{in}$ are initialized randomly. $W_{rnn}$ is initialized from a Gaussian distribution $\mathcal{N}(0,1)$ and $W_{in}$ is initialized from $\mathcal{N}(0,0.1)$. The sparsity of the RNN weight matrix can be controlled by the parameter $\phi$ and it may be scaled to have a spectral radius of less than one, for stability. For example, the RNN weight matrix may be 90% sparse and have a spectral radius of 0.95.

Figure 3:
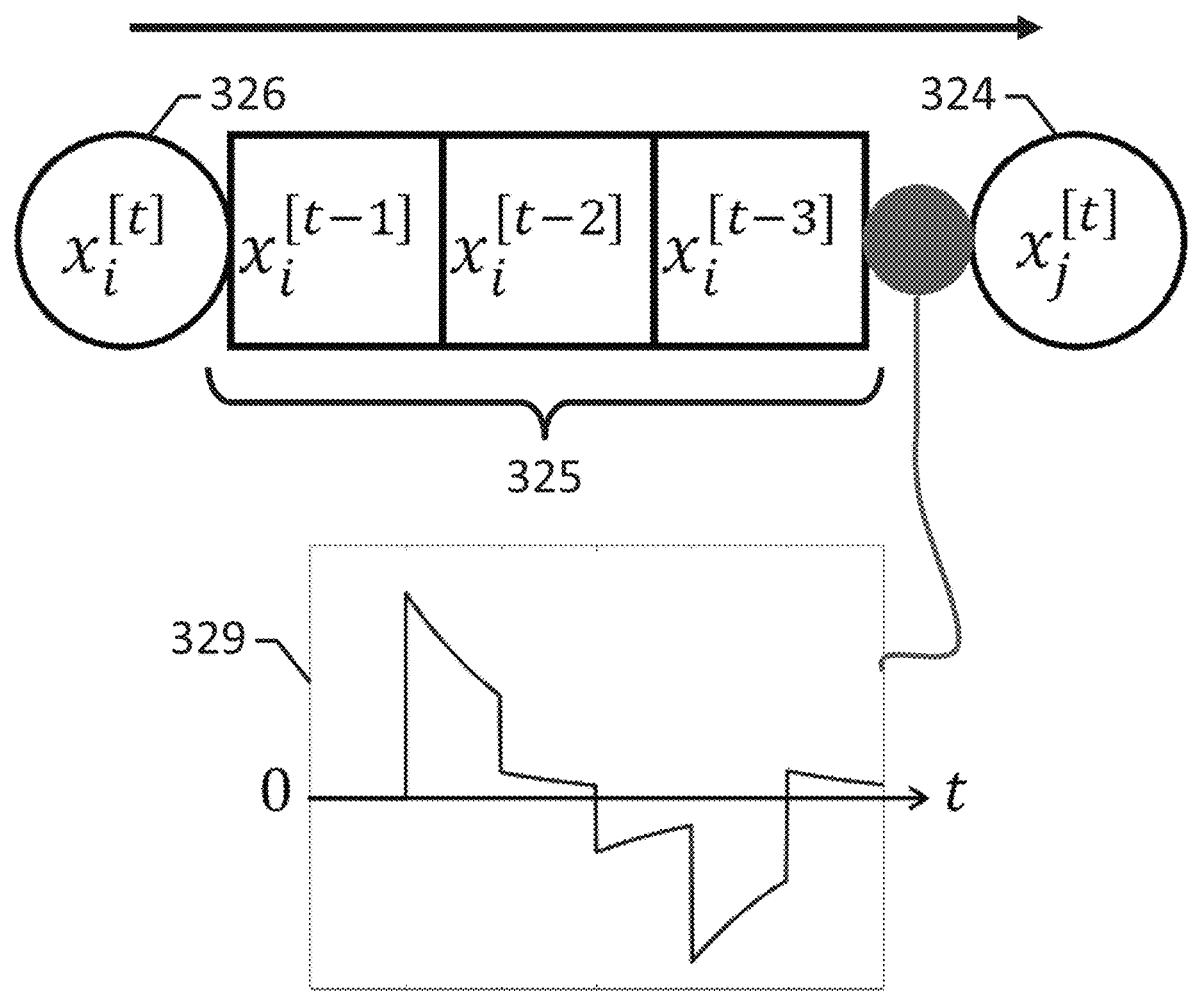
FIG. 3 shows a connection between a presynaptic neuron and a post-synaptic neuron via a FIFO queue, and an eligibility trace, according to an embodiment of the present invention.

FIG. 3 shows a connection between a presynaptic neuron 326 and a post-synaptic neuron 324 via a first-in-first-out (FIFO) queue 325, along with a synaptic eligibility trace 329, according to an embodiment of the present invention.

Neuron i may generate a spike, $x_i^{[t]}$, at time t according to a probability density function with $T \to \infty$. The spike generated at pre-synaptic neuron 326 i travels along FIFO queue 325 towards post-synaptic neuron 324j and reaches synapse 329 after the delay of $d_{i,j}$.

At time t, synapse 329 receives $x_i^{[t-d_{i,j}+1]}$ and updates the eligibility traces, $\alpha_{i,j,k}^{[t]}$ for $k=1, \ldots, K$, using only the information that is locally available at synapse 329. This in turn implies that the probability density function of a spike at post-synaptic neuron 324j can be computed only with the information locally available around post-synaptic neuron 324j (specifically, values stored in the synapses and FIFO queues that are connected to that post-synaptic neuron 324j).

In a DyBM, such as DyBM 210, the probability distribution of the next values, $x^{[t]}$, depends linearly on the values of the eligibility traces and the FIFO queues, which captures the information about the previous values, $x^{[-\infty, t-1]}$.

Figure 4:
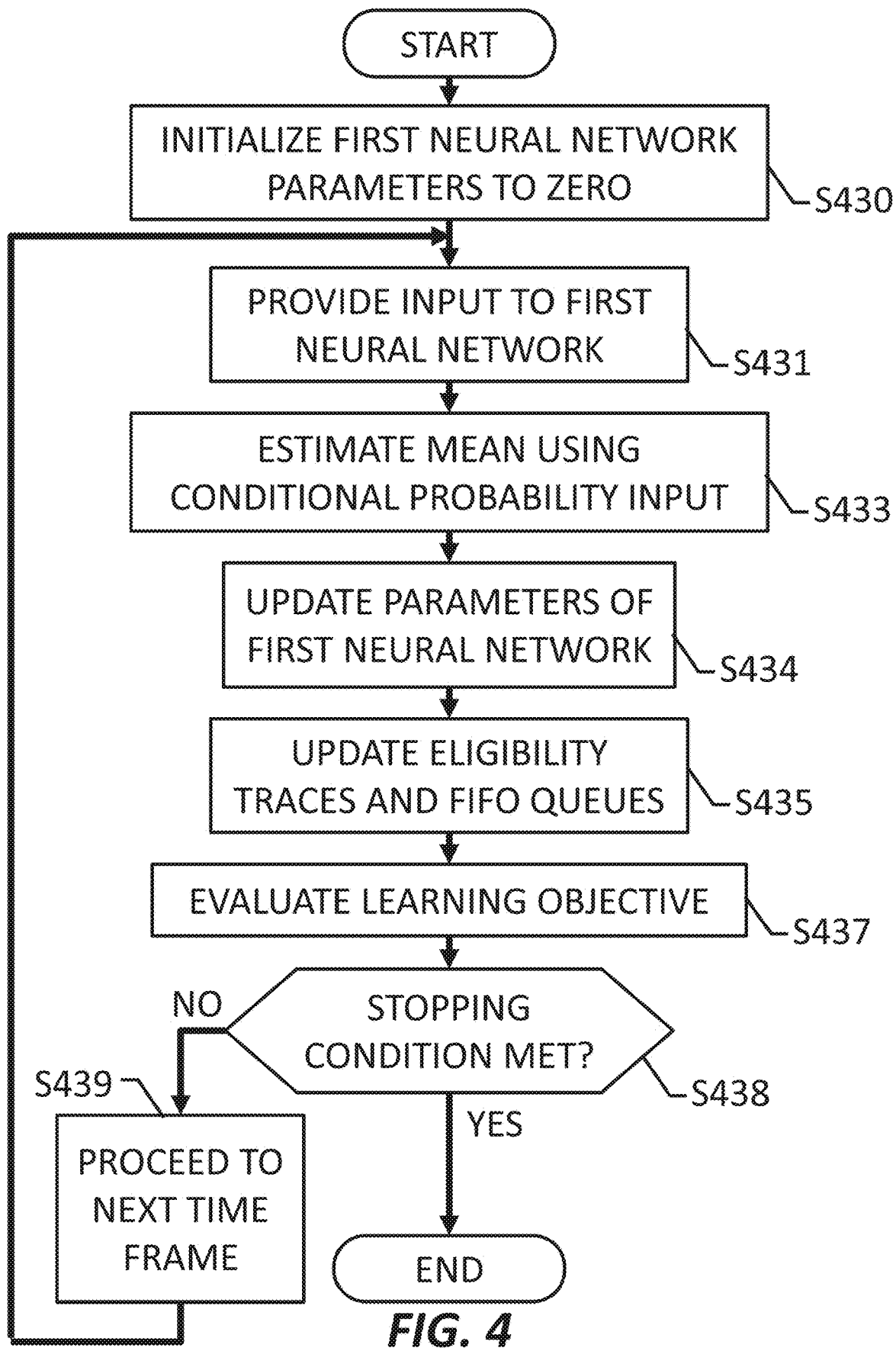
FIG. 4 shows an operational flow for updating a first neural network based on a recurrent neural network, according to an embodiment of the present invention.

FIG. 4 shows an operational flow for updating a first neural network based on a recurrent neural network, according to an embodiment of the present invention. The operational flow may provide a method of updating a first neural network, such as first neural network 110, based on a recurrent neural network, such as RNN 120. The operations may be performed by an apparatus, such as apparatus 100.

At S430, an initializing section, such as initializing section 105, may initialize a plurality of first parameters of the first neural network. For example, the initializing section may initialize the plurality of first parameters to zero. In some embodiments, the input section may cause all of the weight and bias parameters of the first neural network to be initialized to zero. The input section may also cause the FIFO queues and the eligibility traces to be initialized with zero vectors.

At S431, an input section, such as input section 102, may provide an input to a first neural network including a plurality of first parameters. In this embodiment, the input section provides a single time frame, which may be a current time frame, to an input layer of the first neural network. As the operational flow in FIG. 4 proceeds through iterations, a sequential time frame is input to the input layer of the first neural network at each iteration of S431.

At S433, an estimating section, such as estimating section 106, may estimate a mean of the conditional probability input. For example, the estimating section may estimate a mean of the current time frame of the input using a conditional probability density of the input, wherein a current time frame of the input is assumed to have a Gaussian distribution.

In the standard Gaussian DyBM the conditional probability density of time-series vector $x^{[t]}$ given $x^{[t-T,t-1]}$ may be represented as:

$$p(x^{[t]} \mid x^{[t-T,t-1]}) = \prod_{j=1}^{N} p_j(x_j^{[t]} \mid x^{[t-T,t-1]}), \quad \text{(Equation 1)}$$

Assuming that $x_j^{[t]}$ has a Gaussian distribution for each j with mean $\mu_j$ and standard deviation $\sigma_j$, the conditional probability may be represented as:

$$p_j(x_j^{[t]} \mid x^{[t-T,t-1]}) = \frac{1}{\sqrt{2\pi\sigma_j^2}} \exp\left(-\frac{(x_j^{[t]} - \mu_j^{[t]})^2}{2\sigma_j^2}\right), \quad \text{(Equation 2)}$$

Here the mean of the distribution $\mu_j^{[t]}$ may be updated based on the parameters of DyBM and can be interpreted as the expected value of the j-th unit at time t given the last T patterns. For $T \to \infty$ the mean can be written as:

$$\mu_j^{[t]} \equiv b_j + \sum_{i=1}^{N} \sum_{\delta=1}^{d_{i,j}-1} w_{i,j}^{[\delta]} x_i^{[t-\delta]} + \sum_{i=1}^{N} \sum_{k=1}^{K} u_{i,j,k} \alpha_{i,j,k}^{[t-1]}, \quad \text{(Equation 3)}$$

Where $d_{i,j}$ is the maximum delay between units and $\alpha_{i,j,k}^{[t-1]}$ is the eligibility trace updated recursively with decay rate $\lambda_k$:

$$\alpha_{i,j,k}^{[t]} = \lambda_k \alpha_{i,j,k}^{[t-1]} + x_i^{[-d_{i,j}+1]} \quad \text{(Equation 4)}$$

For optimized computational efficiency, an equivalent form of equation (3) with vectors and matrices may be considered such that:

$$\mu^{[t]} = b + \sum_{\delta=1}^{d-1} W^{[\delta]} X^{[t-\delta]} + \sum_{k=1}^{K} U_k \alpha_k^{[t-1]}, \quad \text{(Equation 5)}$$

Where μ is a N×1 dimensional vector, b is the N×1 dimensional bias vector, $W^{[\delta]}$ is the N×N dimensional weight matrix, $U_k$ is N×N dimensional weight matrix and $\alpha_k$ is N×1 dimensional eligibility trace vector. In embodiments where the bias vector is considered to be time-dependent, it may be updated as:

$$b^{[t]} = b^{[t-1]} + A^T \Psi^{[t]} \quad \text{(Equation 6)}$$

Here, $\Psi^{[t]}$ is the M×1 dimensional state vector at time t of an M dimensional RNN. A is the M×N dimensional learned output weight matrix that connects the RNN state to the bias vector. In this embodiment, the estimating section estimates the mean using Equations 5 and 6. In other embodiments, the estimating section may use other equations, which may be derived from a non-Gaussian distribution, or may be in expanded form due to non-identical FIFO queue length.

At S434, an updating section, such as updating section 103, may update parameters of the first neural network. For example, the updating section may update at least one first parameter based on an output from a recurrent neural network, such as RNN 120, provided with the same input. This may include an operation whereby a learning section, such as learning section 107, may learn parameters of the first neural network, the standard deviation of the distribution, and the output weight values of the RNN. For example, the learning section may learn the first parameters, a standard deviation of the current time frame of the input, and a plurality of output weight values of the output from the recurrent neural network. In this embodiment, the first parameters include a bias parameter, which may be updated by the updating section during this operation.

Using Equations 5 and 6, the parameters of the first neural network may be updated as:

$$b_j \leftarrow b_j + \eta \frac{(x_j^{[t]} - \mu_j^{[t]})}{\sigma_j^2}, \quad \text{(Equation 7)}$$

$$\sigma_j \leftarrow \sigma_j + \eta \left( \frac{(x_j^{[t]} - \mu_j^{[t]})^2}{\sigma_j^2} - 1 \right) \frac{1}{\sigma_j}, \quad \text{(Equation 8)}$$

$$w_{i,j}^{[\delta]} \leftarrow w_{i,j}^{[\delta]} + \eta \frac{(x_j^{[t]} - \mu_j^{[t]})}{\sigma_j^2} x_i^{[t-\delta]}, \quad \text{(Equation 9)}$$

$$u_{i,j,k} \leftarrow u_{i,j,k} + \eta \frac{(x_j^{[t]} - \mu_j^{[t]})}{\sigma_j^2} \alpha_{i,j,k}^{[t-1]}, \quad \text{(Equation 10)}$$

$$A_{l,j} \leftarrow A_{l,j} + \eta' \frac{(x_j^{[t]} - \mu_j^{[t]})}{\sigma_j^2} \psi_l^{[t]}, \quad \text{(Equation 11)}$$

Where the learning rate $\eta' \ll \eta$ such that $A_{l,j}$ is stationary while other parameters update. Here, $k=1, \ldots, K$, $\delta = 1, \ldots, d_{i,j}-1$, $(i,j) \in \{1, \ldots, N\}$, and $l \in \{1, \ldots M\}$. Although in this embodiment the results are shown using a Gaussian DyBM as the first neural network for a time series of real values, such as input 101, this operation may be extended to a standard DyBM based on the form of the energy function of a standard DyBM.

At S435, the updating section may update eligibility traces and FIFO queues of the first neural network. For example, the updating section may update a plurality of eligibility traces and a plurality of FIFO queues of the first neural network. In this embodiment, the eligibility traces $\alpha_{i,j,k}^{[t]}$ are updated using Equation 4.

At S437, an evaluating section, such as evaluating section 108, may evaluate a learning objective of the first neural network. Training of the first neural network may be carried out based on a learning rule that maximizes the log-likelihood of a given time-series data D. The log-likelihood of D is given by:

$$LL(D) = \sum_{x \in D} \sum_{t} \log p(x^{[t]} | x^{[-\infty, t-1]}) \quad \text{(Equation 12)}$$

Considering a single time-series (for ease of depiction), a stochastic gradient learning rule may update the parameters of the first neural network at each time-step t according to the gradient of the conditional probability density of $x^{[t]}$. Based on Equations 1 and 2 this may be calculated as:

$$\nabla \log p(x^{[t]} | x^{[-\infty, t-1]}) = \quad \text{(Equation 13)}$$
$$-\sum_{i=1}^{N} \left( \frac{1}{2} \nabla \log \sigma_i^2 + \nabla \frac{(x_i^{[t]} - \mu_i^{[t]})^2}{2\sigma_i^2} \right)$$

At S438, the apparatus may determine whether a stopping condition is met. If the stopping condition is met, such as if a maximum number of iterations have been performed or the end of the time series is reached, then the operational flow is discontinued. If the stopping condition is not met, such as if a maximum number of iterations have not yet been performed or the end of the time series has not yet been reached, then the operational flow proceeds to S439.

At S439, the apparatus may proceed to the next time frame, and the operational flow may return to operation S431 to perform the next iteration. In the next iteration, the current time frame becomes a previous time frame, and the subsequent time frame becomes the current time frame.

Figure 5:
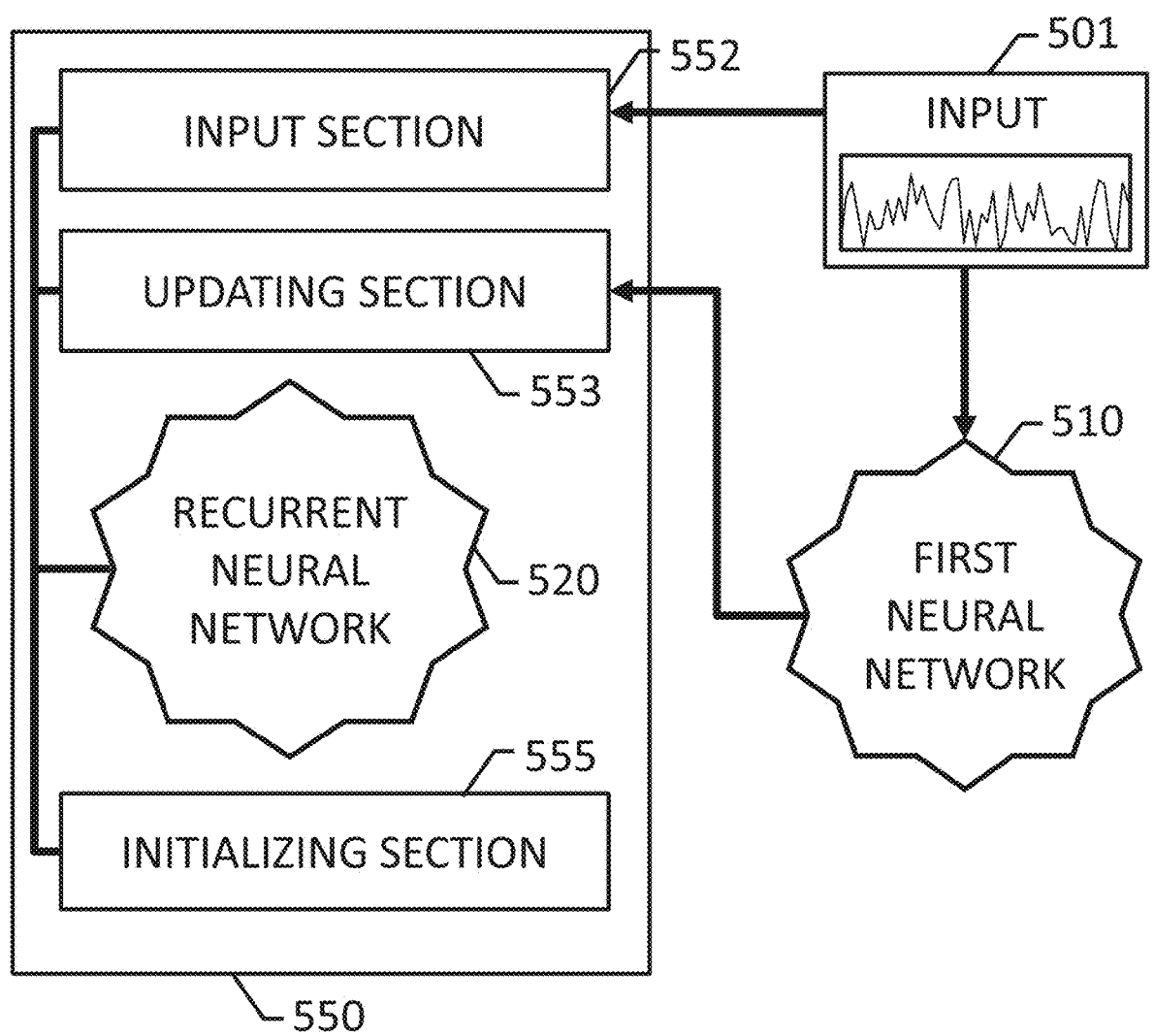
FIG. 5 shows an apparatus for updating a recurrent neural network based on a first neural network, according to an embodiment of the present invention.

FIG. 5 shows an apparatus 550 for updating a recurrent neural network 520 based on a first neural network 510, according to an embodiment of the present invention. Apparatus 550 may be a host computer such as a server computer or a mainframe computer that executes an on-premise application and hosts client computers that use it. Apparatus 550 may be a computer system that includes two or more computers. Alternatively, apparatus 550 may be a personal computer that executes an application for a user of apparatus 550.

Apparatus 550 may include an input section 552, an updating section 553, an initializing section 555, and recurrent neural network 520. Apparatus 550 may be a computer program product including one or more computer readable storage mediums collectively storing program instructions that are executable by a computer to cause the computer to perform the operations of the various sections. Apparatus 550 may alternatively be analog or digital programmable circuitry, or any combination thereof. Apparatus 550 may be composed of physically separated storage or circuitry that interacts through communication.

Input section 552 may provide data to recurrent neural network 520 from data stores in communication with apparatus 550. For example, input section 552 may be configured to provide an input, such as input 501, to recurrent neural network 520, which includes a plurality of second parameters. Input 501 may be a time series including time frames, each time frame having data specific to that time frame. Input section 552 may communicate directly with such data stores, or may utilize a transceiver to communicate with a computer through wired or wireless communication across a network.

Updating section 553 may update the parameters of one or more neural networks, such as first neural network 550. For example, updating section 553 may be configured to update the plurality of second parameters based on a learning objective of a first neural network provided with the input, such as first neural network 510. The updating section may be further configured to update a state of RNN 520 based on a feature mapping of a history of RNN 520 and a current time frame of the input. The updating section is further configured to update the plurality of second parameters includes updating a plurality of output weights. The updating section may be further configured to update the plurality of second parameters includes maintaining the plurality of input weights of RNN 520 and a plurality of RNN weights of RNN 520. The updating section may be further configured to update a state of RNN 520 using a nonlinear function.

Initializing section 555 may initialize the parameters of one or more neural networks. For example, initializing section 555 may be configured to initialize a plurality of input weights of RNN 520 and a plurality of RNN weights of RNN 520 randomly.

Figure 6:
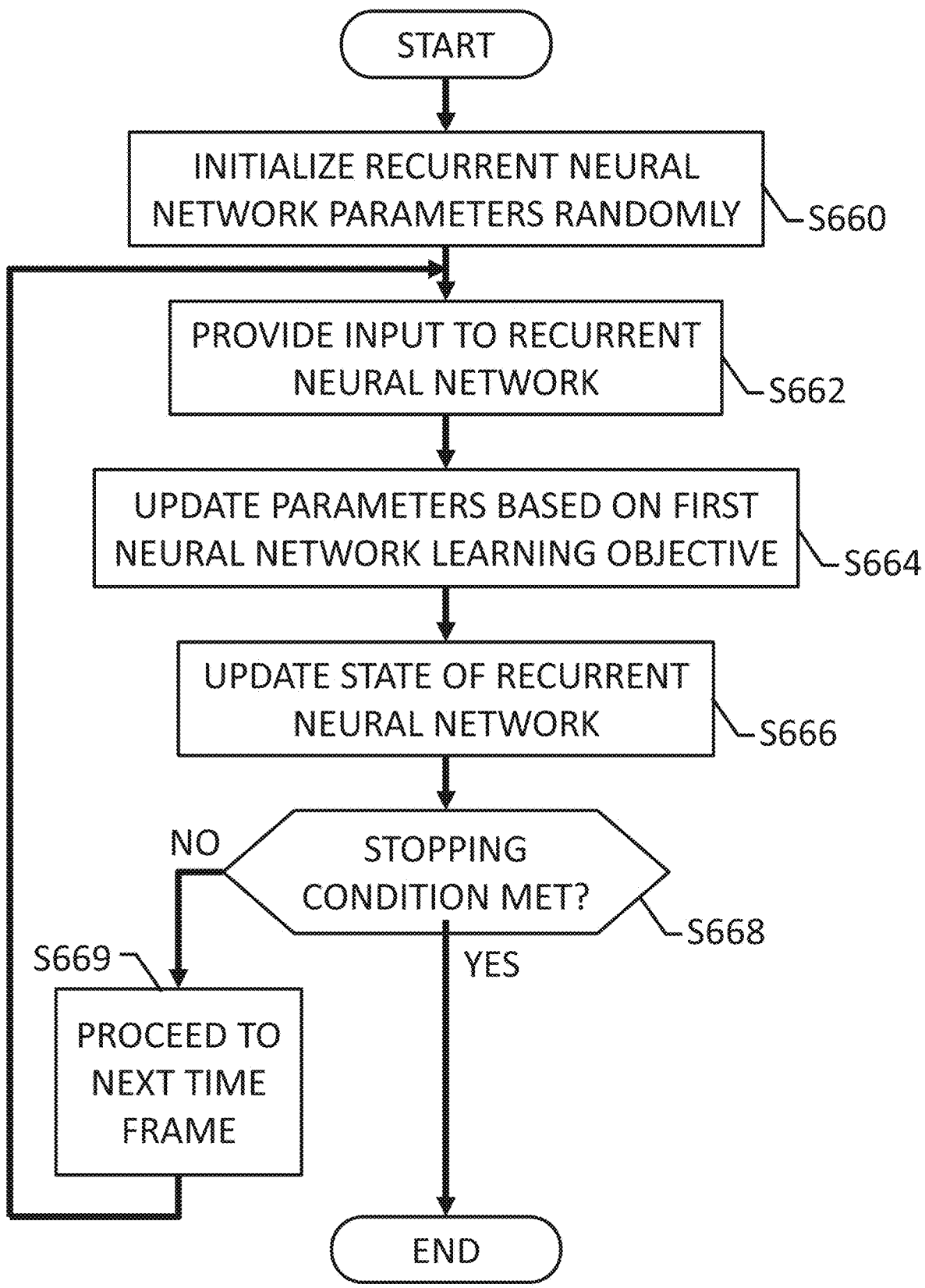
FIG. 6 shows an operational flow for updating a recurrent neural network based on a first neural network, according to an embodiment of the present invention.

FIG. 6 shows an operational flow for updating a recurrent neural network based on a first neural network, according to an embodiment of the present invention. The operational flow may provide a method of updating a recurrent neural network, such as RNN 520, based on a first neural network, such as first neural network 510. The operations may be performed by an apparatus, such as apparatus 550.

At S660, an initializing section, such as initializing section 555, may initialize a plurality of second parameters of the recurrent neural network. For example, the initializing section may initializing a plurality of input weights of the RNN and a plurality of RNN weights of the RNN randomly. In some embodiments, the input section may cause the RNN weights $W_{rnn}$ to be initialized randomly from $\mathcal{N}$ (0,1), and $W_{in}$ to be initialized from $\mathcal{N}$ (0,0.1).

At S662, an input section, such as input section 102, may provide an input to the recurrent neural network including a plurality of second parameters. In this embodiment, the input section provides a single time frame, which may be a current time frame, to the recurrent neural network. As the operational flow in FIG. 6 proceeds through iterations, a sequential time frame is input to the recurrent neural network at each iteration of S662.

At S664, an updating section, such as updating section 553, may update the plurality of second parameters based on a learning objective of a first neural network provided with the input. For example, the updating section may update a plurality of output weights, such as in Equation 6 and 7. However, in many embodiments, the updating of the plurality of second parameters includes maintaining the plurality of input weights of the RNN and a plurality of RNN weights of the RNN.

At S666, the updating section may update a state of the recurrent neural network. For example, the updating section may update a state of the RNN using a nonlinear function. In addition, the updating section may update a state of the RNN based on a feature mapping of a history of the RNN and a current time frame of the input.

From Equation 6, $\Psi^{[t]}$ is the M×1 dimensional state vector at time t of an M dimensional RNN. A is the M×N dimensional learned output weight matrix that connects the RNN state to the bias vector. The RNN state may be updated based on the input time-series vector $x^{[t]}$ as follows:

$$\Psi^{[t]}=(1-\rho)\Psi^{[t-1]}+\rho \; \mathcal{F}(W_{rnn}\Psi^{[t-1]}+W_{in}x^{[t]}), \qquad \text{(Equation 14)}$$

Where, $\mathcal{F}(x)=\tan h(x)$. $\mathcal{F}(x)$ may, however, be replaced by any other suitable nonlinear function or even made linear, such as $\mathcal{F}(x)=x$, by replacing $\mathcal{F}$ in Equation 14 with a constant, such as 1. However, when the function is nonlinear, this may allow the combination to have the benefits of nonlinear analysis provided by the RNN, yet also have the benefits of linear analysis provided by the DyBM. For example, the solution provided by DyBM may never diverge, because it is linear, whereas a solution provided by an RNN alone may not converge under certain conditions. Here, $0<\rho\leq 1$ is the decay rate of the RNN, and may control the amount of memory in each unit of the RNN. In some embodiments, the RNN may be a reservoir computing network as such, the weight matrices $W_{rnn}$ and $W_{in}$ are initialized randomly. $W_{rnn}$ is initialized from a Gaussian distribution $\mathcal{N}$ (0,1) and $W_{in}$ is initialized from a Gaussian distribution $\mathcal{N}$ (0,0.1). The sparsity of the RNN weight matrix can be controlled by the parameter φ, and it is scaled to have a spectral radius of $\rho<1$. In some embodiments, the RNN weight matrix may be 80% sparse, and may have a spectral radius of $\rho=0.95$.

At S668, the apparatus may determine whether a stopping condition is met. If the stopping condition is met, such as if a maximum number of iterations have been performed or the end of the time series is reached, then the operational flow is discontinued. If the stopping condition is not met, such as if a maximum number of iterations have not yet been performed or the end of the time series has not yet been reached, then the operational flow proceeds to S669.

At S669, the apparatus may proceed to the next time frame, and the operational flow may return to operation S662 to perform the next iteration. In the next iteration, the current time frame becomes a previous time frame, and the subsequent time frame becomes the current time frame.

The performance of embodiments of the apparatus have been evaluated by comparison with the best case settings of the standard Gaussian DyBM (baseline) on three synthetic data tasks, and a real data task of predicting monthly sunspot numbers. In all synthetic data cases, the maximum delay in the DyBM d was set equal to 2, and the decay rate γ was set to 0.2. The learning operations used stochastic gradient descent with ADAGRAD optimization and L1 regularization.

Synthetic Task 1 included the prediction of a one dimensional time-series X(t)=sin(dπωt)+ε(t). The frequency $$\omega = \frac{1}{200},$$

DyBM size N=1, ε(t) is dependent Gaussian white noise. RNN size M varies as 10, 50, 100, and 500.

Synthetic Task 2: Predict a 50 dimensional time-series X(t). Where each dimension $x_d^{[t]}$=sin(dπωt)+ε(t), d=(1, 2, 3, ..., 50). The frequency $$\omega = \frac{1}{200},$$

DyBM size N=50, ε(t) is dependent Gaussian white noise. RNN size M=300.

Synthetic Task 3: Predict a 30th order nonlinear autoregressive moving average process (NARMA-30) X(t)—which takes as input a time-dependent random variable Y(t) drawn uniformly from [0, 0.5], and its output depends nonlinearly on its own history as well as the history of Y(t) from 30 time steps in the past. Task 3 used the following equation:

$$x^{[t]} = \qquad \text{(Equation 15)}$$
$$0.2x^{[t-1]} + 0.004x^{[t-1]}\left[\sum_{i=0}^{29} x^{[t-1-i]}\right] + 1.5u^{[t-30]}u^{[t-1]} + 0.01$$

DyBM size was N=1, and RNN size was M=100.

Real Task: Predict the monthly sunspot number according to the historic benchmark collected in Zurich from January 1749 to December 1983. DyBM size was N=1, and RNN size was M=50.

Embodiments of the apparatus outperformed a standard Gaussian DyBM significantly in all three synthetic tasks, outperformed vector autoregression models in all tasks, and outperformed vector autoregression and LSTM (long short-term memory) models, such as models based on Hochreiter, S., and Schmidhuber, J. 1997, Long short-term memory, *Neural computation* 9(8):1735-1780, in the real task. In performance testing, in terms of the average CPU time taken to execute a single training epoch on the monthly sunspot data prediction task, embodiments of the apparatus not only achieve comparable or improved performance over an LSTM, but also learn about 16 times faster than the LSTM model. As such, embodiments of the apparatus are highly scalable in an online learning environment, whereas LSTM models may have difficulty in any online learning environment. The VAR (vector autoregressive) model, as a standard multi-variate time-series learning model, which does not have any eligibility traces and hidden units, runs much faster, but with significantly lower predictive accuracy.

Figure 7:
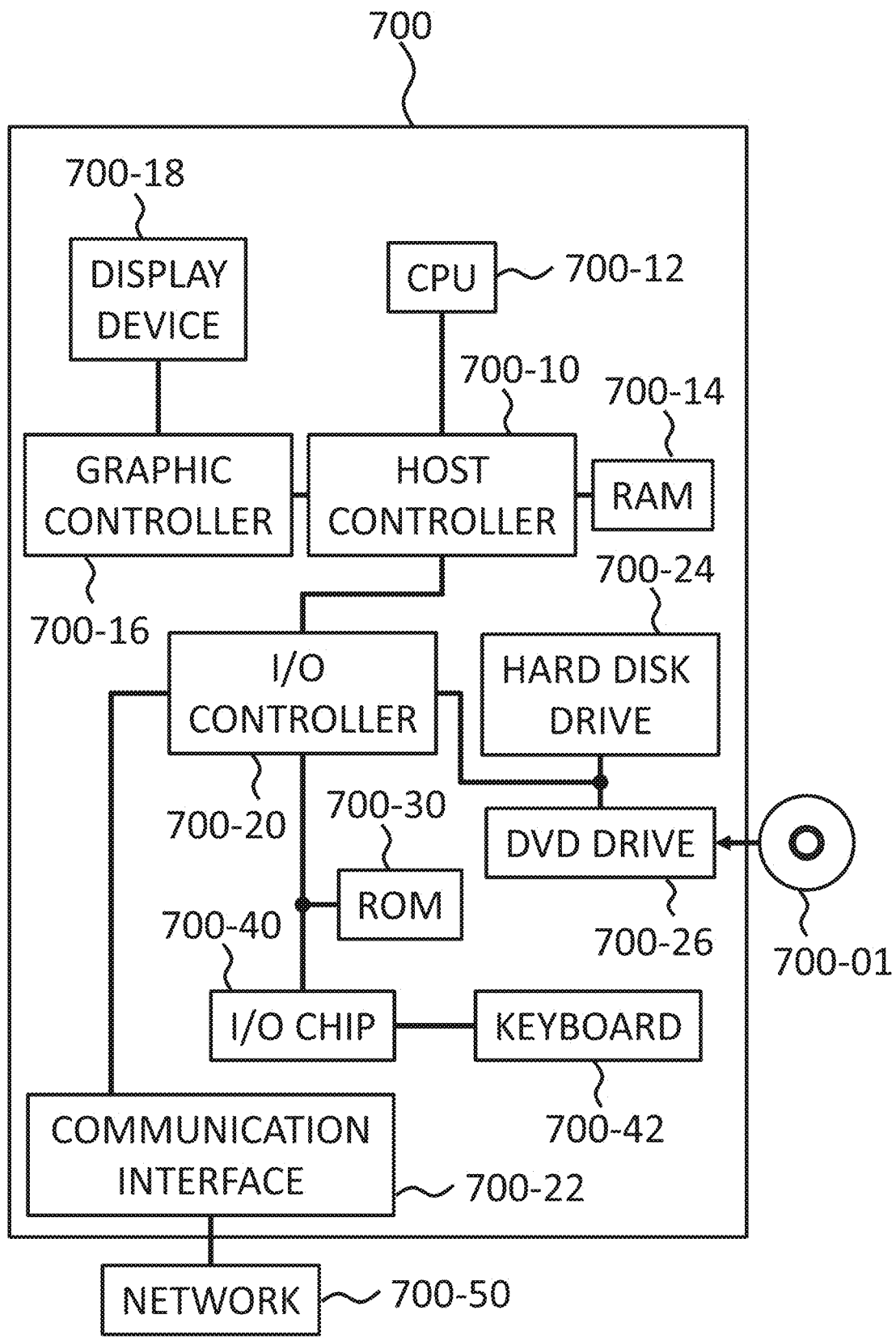
FIG. 7 shows an exemplary hardware configuration of a computer configured for cloud service utilization, according to an embodiment of the present invention.

FIG. 7 shows an exemplary hardware configuration of a computer configured to perform the foregoing operations, according to an embodiment of the present invention. A program that is installed in the computer 700 can cause the computer 700 to function as or perform operations associated with apparatuses of the embodiments of the present invention or one or more sections (including modules, components, elements, etc.) thereof, and/or cause the computer 700 to perform processes of the embodiments of the present invention or steps thereof. Such a program may be executed by the CPU 700-12 to cause the computer 700 to perform certain operations associated with some or all of the blocks of flowcharts and block diagrams described herein.

The computer 700 according to the present embodiment includes a CPU 700-12, a RAM 700-14, a graphics controller 700-16, and a display device 700-18, which are mutually connected by a host controller 700-10. The computer 700 also includes input/output units such as a communication interface 700-22, a hard disk drive 700-24, a DVD-ROM drive 700-26 and an IC card drive, which are connected to the host controller 700-10 via an input/output controller 700-20. The computer also includes legacy input/output units such as a ROM 700-30 and a keyboard 700-42, which are connected to the input/output controller 700-20 through an input/output chip 700-40.

The CPU 700-12 operates according to programs stored in the ROM 700-30 and the RAM 700-14, thereby controlling each unit. The graphics controller 700-16 obtains image data generated by the CPU 700-12 on a frame buffer or the like provided in the RAM 700-14 or in itself, and causes the image data to be displayed on the display device 700-18.

The communication interface 700-22 communicates with other electronic devices via a network 700-50. The hard disk drive 700-24 stores programs and data used by the CPU 700-12 within the computer 700. The DVD-ROM drive 700-26 reads the programs or the data from the DVD-ROM 700-01, and provides the hard disk drive 700-24 with the programs or the data via the RAM 700-14. The IC card drive reads programs and data from an IC card, and/or writes programs and data into the IC card.

The ROM 700-30 stores therein a boot program or the like executed by the computer 700 at the time of activation, and/or a program depending on the hardware of the computer 700. The input/output chip 700-40 may also connect various input/output units via a parallel port, a serial port, a keyboard port, a mouse port, and the like to the input/output controller 700-20.

A program is provided by computer readable media such as the DVD-ROM 700-01 or the IC card. The program is read from the computer readable media, installed into the hard disk drive 700-24, RAM 700-14, or ROM 700-30, which are also examples of computer readable media, and executed by the CPU 700-12. The information processing described in these programs is read into the computer 700, resulting in cooperation between a program and the above-mentioned various types of hardware resources. An apparatus or method may be constituted by realizing the operation or processing of information in accordance with the usage of the computer 700-

For example, when communication is performed between the computer 700 and an external device, the CPU 700-12 may execute a communication program loaded onto the RAM 700-14 to instruct communication processing to the communication interface 700-22, based on the processing described in the communication program. The communication interface 700-22, under control of the CPU 700-12, reads transmission data stored on a transmission buffering region provided in a recording medium such as the RAM 700-14, the hard disk drive 700-24, the DVD-ROM 700-01, or the IC card, and transmits the read transmission data to network 700-50 or writes reception data received from network 700-50 to a reception buffering region or the like provided on the recording medium.

In addition, the CPU 700-12 may cause all or a necessary portion of a file or a database to be read into the RAM 700-14, the file or the database having been stored in an external recording medium such as the hard disk drive 700-24, the DVD-ROM drive 700-26 (DVD-ROM 700-01), the IC card, etc., and perform various types of processing on the data on the RAM 700-14. The CPU 700-12 may then write back the processed data to the external recording medium.

Various types of information, such as various types of programs, data, tables, and databases, may be stored in the recording medium to undergo information processing. The CPU 700-12 may perform various types of processing on the data read from the RAM 700-14, which includes various types of operations, processing of information, condition judging, conditional branch, unconditional branch, search/replace of information, etc., as described throughout this disclosure and designated by an instruction sequence of programs, and writes the result back to the RAM 700-14. In addition, the CPU 700-12 may search for information in a file, a database, etc., in the recording medium. For example, when a plurality of entries, each having an attribute value of a first attribute is associated with an attribute value of a second attribute, are stored in the recording medium, the CPU 700-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 700. In addition, a recording medium such as a hard disk or a RAM provided in a server system connected to a dedicated communication network or the Internet can be used as the computer readable media, thereby providing the program to the computer 700 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize cloud service utilization.

What is claimed is:

1. A method comprising:
receiving an input by an input node of a Boltzmann machine including a plurality of first parameters, the input comprising a N-dimensional time-series input data vector, wherein N is an integer greater than 0;
receiving the input by an input node of a recurrent neural network configured as a non-linear extension of the Boltzmann machine to cooperatively process the input for a post-training given task until the post-training given task completion providing a final output from the recurrent neural network, the input nodes of the Boltzmann machine and the input nodes to the recurrent neural network comprising different input nodes; and
updating at least one first parameter of the plurality of first parameters based on the final output from the recurrent neural network provided with the input, the recurrent neural network including a plurality of second parameters,
wherein the given task is a post processing task and the input received by the input node of the Boltzmann machine and the input received by the input node of the recurrent neural network are unmodified identical values of multiple time frames, and wherein the Boltzmann machine and the recurrent neural network are mutually exclusive and each comprise a single neural network.

2. The method according to claim 1, wherein the at least one first parameter includes a bias parameter.

3. The method according to claim 1, further comprising initializing the plurality of first parameters to zero.

4. The method according to claim 1, further comprising estimating a mean of a current time frame of the input using a conditional probability density of the input, wherein the current time frame of the input is assumed to have a Gaussian distribution.

5. The method according o claim 4, wherein the updating includes learning the plurality of first parameters, a standard deviation of the current time frame of the input, and a plurality of output weight values of the final output from the recurrent neural network.

6. The method according to claim 1, wherein the Boltzmann machine includes
a plurality of layers of nodes among a plurality of nodes, each layer sequentially forwarding values of a time frame of the input, the plurality of layers of nodes including
a first layer of a plurality of input nodes among the plurality of nodes, the input nodes receiving values of a current time frame of the input, and
a plurality of intermediate layers, each node in each intermediate layer forwarding a value to a node. in a subsequent or shared layer, and
a plurality of weight values among the plurality of first parameters, each weight value to be applied to each value in a corresponding node to obtain a value propagating from a pre-synaptic node to a post-synaptic node.

* * * * *